United States Patent
Fukui et al.

(10) Patent No.: US 10,371,254 B2
(45) Date of Patent: Aug. 6, 2019

(54) VEHICLE DRIVE DEVICE

(71) Applicant: AISIN AW CO., LTD., Anjo-shi, Aichi-ken (JP)

(72) Inventors: Taisuke Fukui, Anjo (JP); Satoru Kasuya, Anjo (JP); Nobukazu Ike, Anjo (JP); Masashi Kito, Anjo (JP); Seigo Kano, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 264 days.

(21) Appl. No.: 14/902,177

(22) PCT Filed: Aug. 28, 2014

(86) PCT No.: PCT/JP2014/072560
§ 371 (c)(1),
(2) Date: Dec. 30, 2015

(87) PCT Pub. No.: WO2015/030110
PCT Pub. Date: Mar. 5, 2015

(65) Prior Publication Data
US 2016/0281842 A1 Sep. 29, 2016

(30) Foreign Application Priority Data

Aug. 29, 2013 (JP) ................................. 2013-178295

(51) Int. Cl.
*F16H 57/04* (2010.01)
*F16H 61/00* (2006.01)
(Continued)

(52) U.S. Cl.
CPC ..... *F16H 61/0031* (2013.01); *F16H 37/0813* (2013.01); *F16H 57/02* (2013.01);
(Continued)

(58) Field of Classification Search
None
See application file for complete search history.

(56) References Cited

U.S. PATENT DOCUMENTS 4,860,850 A * 8/1989 Takahashi ............. B60K 17/28
180/215
5,443,429 A 8/1995 Baxter, Jr.
(Continued)

FOREIGN PATENT DOCUMENTS

CN 101208544 A 6/2008
DE 102010027714 A1 5/2011
(Continued)

OTHER PUBLICATIONS

Nov. 18, 2014 International Search Report issued in International Patent Application No. PCT/JP2014/072560.

*Primary Examiner* — Charles A Fox
*Assistant Examiner* — Ryan P Dodd
(74) *Attorney, Agent, or Firm* — Oliff PLC

(57) ABSTRACT

A vehicle drive device that includes an input member that is drivingly connected to a driving force source for wheels; a hydraulic transmission device that includes a transmission input member coaxially disposed with the input member and changes a speed of rotation of the transmission input member and transmits the rotation to a transmission output member; a differential gear device that has an axis different from an axis of the input member and distributes a drive force transmitted from the transmission output member to the wheels; a case that houses at least the transmission device and the differential gear device; an electric oil pump that is driven by a pump rotary electric machine; and a hydraulic control device that controls a hydraulic pressure of oil discharged from the electric oil pump and supplies the oil at least to the transmission device.

8 Claims, 3 Drawing Sheets

(51) Int. Cl.
*F16H 57/023* (2012.01)
*F16H 37/08* (2006.01)
*F16H 57/02* (2012.01)

(52) U.S. Cl.
CPC ........... *F16H 57/023* (2013.01); *F16H 57/04* (2013.01); *F16H 57/0439* (2013.01); *F16H 57/0441* (2013.01); *F16H 57/0404* (2013.01); *F16H 61/0028* (2013.01)

(56) References Cited

U.S. PATENT DOCUMENTS

| | | | | |
|---|---|---|---|---|
| 5,474,428 | A * | 12/1995 | Kimura | F16H 57/0439 192/48.92 |
| 6,189,412 | B1 * | 2/2001 | Tsubata | F16H 57/0489 474/43 |
| 7,610,979 | B1 * | 11/2009 | Dykowski | B62K 5/027 180/210 |
| 8,448,541 | B2 * | 5/2013 | Kasuya | B60K 6/387 180/65.245 |
| 8,790,217 | B1 * | 7/2014 | Bowers | F16H 48/20 477/35 |
| 2002/0060099 | A1 * | 5/2002 | Takenaka | B60K 6/365 180/65.1 |
| 2005/0187066 | A1 * | 8/2005 | Moses | B60K 6/383 477/2 |
| 2006/0054445 | A1 | 3/2006 | Pashnik et al. | |
| 2008/0099305 | A1 * | 5/2008 | Ogasawara | F16D 25/0638 192/82 R |
| 2009/0082153 | A1 | 3/2009 | Fujikawa et al. | |
| 2009/0177361 | A1 | 7/2009 | Muller et al. | |
| 2010/0084206 | A1 | 4/2010 | Yoshida et al. | |
| 2010/0242669 | A1 | 9/2010 | Komizo et al. | |
| 2010/0243396 | A1 * | 9/2010 | Mizuno | F16D 48/04 192/48.603 |
| 2011/0036652 | A1 | 2/2011 | Honda et al. | |
| 2012/0082570 | A1 | 4/2012 | Schultz | |
| 2012/0128513 | A1 * | 5/2012 | Sakata | F04C 2/086 417/410.1 |
| 2015/0057858 | A1 * | 2/2015 | Nitta | F01M 1/02 701/22 |
| 2016/0003245 | A1 * | 1/2016 | Ike | F16H 61/0025 417/362 |

FOREIGN PATENT DOCUMENTS

| | | |
|---|---|---|
| JP | H07-237461 A | 9/1995 |
| JP | H10-274320 A | 10/1998 |
| JP | 2002-120575 A | 4/2002 |
| JP | 2008-128096 A | 6/2008 |
| JP | 2009-222159 A | 10/2009 |
| JP | 2010-236581 A | 10/2010 |
| JP | 2013-113304 A | 6/2013 |

* cited by examiner

VEHICLE DRIVE DEVICE

BACKGROUND

The present disclosure relates to a vehicle drive device including an electric oil pump as an oil source to a hydraulic transmission device.

In recent years, more and more vehicles have been equipped with an idling stop function of shutting off internal combustion engines in order to reduce fuel consumption and exhaust gas while the vehicles are stationary. A hybrid vehicle using both an internal combustion engine and a rotary electric machine as driving force sources is typically equipped with a function of stopping the internal combustion engine in deceleration as well as while the vehicle is stationary. On the other hand, in a vehicle including a hydraulic transmission device, a mechanical oil pump driven by an internal combustion engine is stopped by stopping the internal combustion engine. In this case, without another hydraulic supplier, oil may not be supplied to the transmission device, and thus the transmission device may not be appropriately operated. To prevent this, it is proposed that an electric oil pump is provided as an auxiliary pump in addition to the mechanical oil pump so that oil discharged from the electric oil pump is supplied to the transmission device while the internal combustion engine is stopped.

SUMMARY

Japanese Patent Application Publication No. 2010-236581, for example, discloses a vehicle drive device having such a configuration. As disclosed in Japanese Patent Application Publication No. 2010-236581, an electric oil pump is typically provided externally to a case of a vehicle drive device. In such an external electric oil pump, a pump rotary electric machine for driving the pump is cooled with air. To secure or further enhance discharge performance of the electric oil pump, a temperature rise in the pump rotary electric machine needs to be effectively suppressed. However, in many cases, an air-cooled structure is inferior in cooling capability to other cooling structures (e.g., a water-cooled structure and an oil-cooled structure), and may not be able to effectively suppress a temperature rise in the pump rotary electric machine per a unit volume. Thus, the configuration of Japanese Patent Application Publication No. 2010-236581 is disadvantageous for enhancing power of the pump rotary electric machine and reducing the size thereof.

It is conceivable to employ a water-cooled structure for cooling the pump rotary electric machine by providing a coolant channel for supplying a coolant to the pump rotary electric machine. However, installation of such a coolant channel complicates a device configuration, leading to an increased size of the entire device. It is also conceivable to employ an oil-cooled structure for cooling the pump rotary electric machine by providing an electric oil pump inside a case of a vehicle drive device. However, the internal space of the case of the vehicle drive device is generally limited in size. Thus, if the electric oil pump is forcedly disposed in the case of the vehicle drive device, the size of the entire device obviously increases.

In view of the foregoing, it is desired to achieve a structure that can enhance power or reduce the size of a pump rotary electric machine while suppressing an increase in size of the entire device.

A vehicle drive device according to an exemplary aspect of the present disclosure includes: an input member that is drivingly connected to a driving force source for wheels; a hydraulic transmission device that includes a transmission input member coaxially disposed with the input member and changes a speed of rotation of the transmission input member and transmits the rotation to a transmission output member; a differential gear device that has an axis different from an axis of the input member and distributes a drive force transmitted from the transmission output member to the wheels; a case that houses at least the transmission device and the differential gear device; an electric oil pump that is driven by a pump rotary electric machine; and a hydraulic control device that controls a hydraulic pressure of oil discharged from the electric oil pump and supplies the oil at least to the transmission device, wherein the electric oil pump and the pump rotary electric machine are housed in the case, the transmission device, the differential gear device, and the pump rotary electric machine are disposed such that a transmission axial center that is a rotation axial center of the transmission input member, a differential axial center that is a rotation axial center of the differential gear device, and a pump axial center that is a rotation axial center of the pump rotary electric machine are parallel to one another, the differential gear device is disposed such that the differential axial center is located below the transmission axial center and does not overlap a vertical plane passing through the transmission axial center when viewed in an axial direction parallel to the axial centers in a vehicle mounted state, the hydraulic control device is disposed at an opposite side to the differential axial center with respect to the vertical plane when viewed in the axial direction, and the pump rotary electric machine is disposed such that the pump axial center is located below the transmission axial center and between the transmission axial center and the hydraulic control device when viewed in the axial direction.

In the present application, the term "drivingly connected" means a state in which two rotary elements are connected so as to be capable of transmitting a drive force (synonymous with torque) therebetween. This concept includes a state in which two rotary elements are connected so as to rotate together and a state in which the two rotary elements are connected so as to be capable of transmitting a drive force therebetween through one or more transmission members. Such transmission members include various members (e.g., a shaft, a gear mechanism, and a belt) for transmitting rotation at the same speed or a changed speed, and may include engagement devices (e.g., a friction engagement device and a mesh engagement device) for selectively transmitting the rotation and the drive force.

In any application, the term "rotary electric machine" is used as a concept including all of a motor (electric motor), a generator (power generator), and a motor generator that functions as both a motor and a generator.

The "vertical plane passing through a transmission axial center" means a virtual plane that extends vertically and includes two optional points on a rotation axial center of a transmission input member within the plane.

With this characteristic configuration, since the pump rotary electric machine for driving the electric oil pump is housed in the case together with the transmission device and the differential gear device, an oil-cooled structure can be employed for cooling a pump rotary electric machine. Thus, cooling capability can be enhanced as compared to an air-cooled structure, for example, and a temperature rise in the pump rotary electric machine can be effectively suppressed. Power of the pump rotary electric machine can be enhanced without an increase in size thereof, or the pump rotary electric machine can be downsized while maintaining the power of the pump rotary electric machine at a certain level or more. Alternatively, both the enhanced power and the downsizing of the pump rotary electric machine described above can be achieved in a balanced manner.

In the characteristic configuration described above, in a vehicle mounted state, the differential axial center is located closer to one side with respect to the transmission axial center when viewed in the axial direction, and the hydraulic control device is located at the opposite side to the differential axial center relative the transmission axial center when viewed in the axial direction. That is, in the vehicle mounted state, the differential gear device, the transmission device, and the hydraulic control device are arranged substantially in this order in a horizontal direction when viewed in the axial direction. In the vehicle mounted state, the differential axial center is located below the transmission axial center. In general, in many cases, a differential gear device is formed to a larger diameter than a transmission device. In the configuration described above, dead space is often formed below the transmission device and between the differential gear device and the hydraulic control device in the case of the vehicle drive device. In addition, in many cases, a differential gear device and a transmission device are circular and a hydraulic control device is rectangular when viewed in the axial direction, so that dead space as described above is often formed especially below the transmission device and between the transmission axial center and the hydraulic control device. In view of this, in the characteristic configuration described above, the pump rotary electric machine is disposed such that the pump axial center is located below the transmission axial center and between the transmission axial center and the hydraulic control device when viewed in the axial direction. With such a layout configuration, internal space of the case of the vehicle drive device can be effectively utilized to dispose the electric oil pump and the pump rotary electric machine. As a result, an increase in size of the entire vehicle drive device can be effectively suppressed.

Preferred aspects of the present disclosure will be described below. Note that the scope of the present disclosure is not limited to the following preferred aspects.

In an aspect, at least a part of the pump rotary electric machine is preferably located below an oil level of oil stored in the case.

With this configuration, at least part of the pump rotary electric machine can be substantially always cooled by oil stored in the case. Thus, a temperature rise in the pump rotary electric machine can be more effectively suppressed, and further enhanced power and/or downsizing of the pump rotary electric machine can be achieved.

In another aspect, the vehicle drive device preferably includes a strainer configured to filter oil, and the strainer is preferably located below the transmission axial center and between the differential axial center and the electric oil pump when viewed in the axial direction.

With this configuration, the strainer can be disposed by effectively using the above-described dead space formed below the transmission device and between the differential gear device and the hydraulic control device while suppressing an increase in size of the entire device. In this case, in the vehicle mounted state, the strainer, the electric oil pump, and the hydraulic control device are arranged substantially in this order in a horizontal direction when viewed in the axial direction. Thus, a flow of oil from the strainer to the hydraulic control device can be made substantially linear, thereby enhancing the suction efficiency and the discharge efficiency of the electric oil pump.

In still another aspect, the vehicle drive device preferably includes a mechanical oil pump that is driven by the driving force source, and the mechanical oil pump is preferably disposed to have a rotation axial center located below the transmission axial center and between the transmission axial center and the hydraulic control device when viewed in the axial direction.

With this configuration, when the driving force source for wheels is being driven, oil discharged by the mechanical oil pump can be supplied to the transmission device. In addition, in this configuration, the mechanical oil pump can be disposed by effectively utilizing the dead space formed below the transmission device and between the transmission axial center and the hydraulic control device. Thus, an increase in size of the entire device can be suppressed with both the mechanical oil pump and the electric oil pump being disposed in the case of the vehicle drive device.

DETAILED DESCRIPTION OF EMBODIMENTS

A vehicle drive device according to an embodiment of the present disclosure will be described with reference to the drawings. A vehicle drive device 1 according to this embodiment is a vehicle drive device (engine vehicle drive device) for driving a vehicle (so-called engine vehicle) including an internal combustion engine E as a sole driving source P for wheels W of the vehicle. In this embodiment, the vehicle drive device 1 is configured as a vehicle drive device (idling stop vehicle drive device) for driving a vehicle (idling stop vehicle) having an idling stop function of stopping the internal combustion engine E while the vehicle is stationary. In an idling stop vehicle, it is possible to reduce a fuel consumption amount and exhaust gas.

Figure 1:
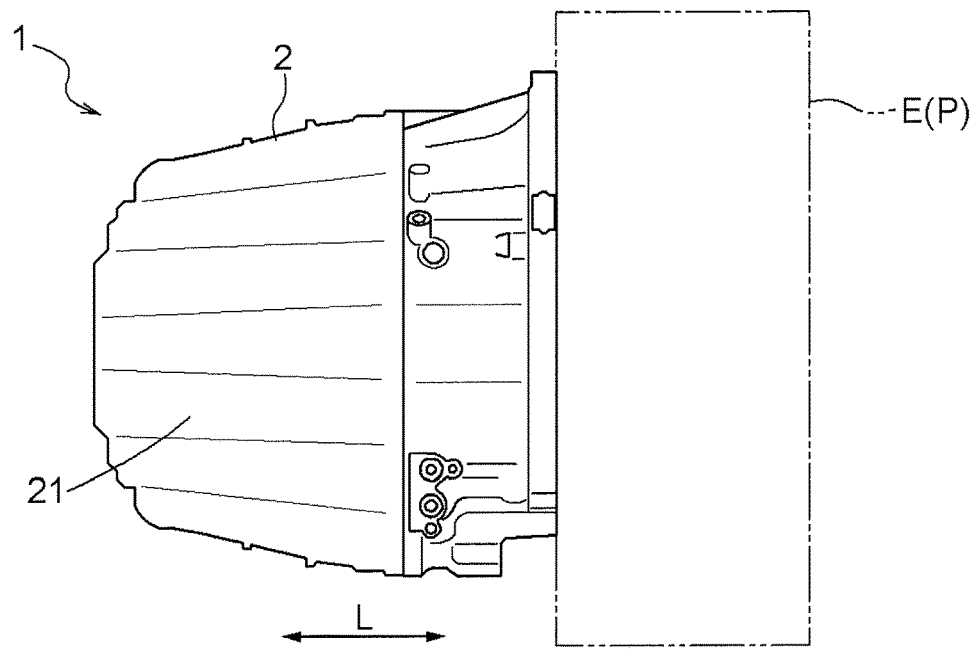
FIG. 1 is a side view illustrating an appearance of a vehicle drive device.

FIG. 1 is a side view illustrating an appearance of the vehicle drive device 1 according to this embodiment. FIG. 1 illustrates a case 2 (drive device case) that houses various components 1 and various devices, for example included in the vehicle drive device. An outer shape of the internal combustion engine E coupled to the case 2 is indicated by an alternate long and two short dashes line.

Figure 2:
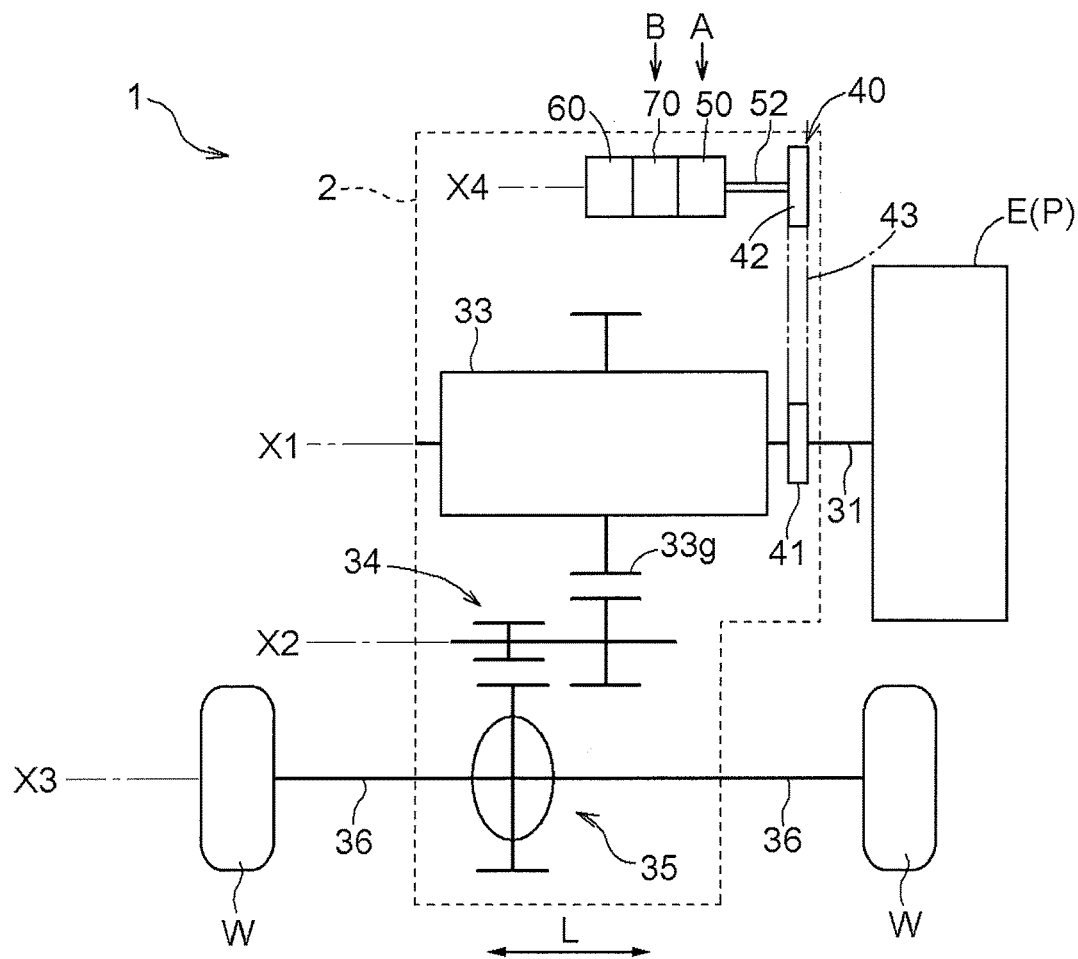
FIG. 2 is a diagram that schematically illustrates a configuration of the vehicle drive device.

As illustrated in FIG. 2, the vehicle drive device 1 includes an input shaft 31 drivingly connected to the internal combustion engine E, and a plurality of (two in this example) output shafts 36 respectively drivingly connected to a plurality of (two in this example) wheels W. The vehicle drive device 1 also includes a transmission device 33, a counter gear mechanism 34, and a differential gear device 35. The transmission device 33, the counter gear mechanism 34, and the differential gear device 35 are provided in this order from the input shaft 31 along a power transmission path connecting the input shaft 31 to the output shafts 36. These components are housed in the case 2. In this embodiment, the input shaft 31 corresponds to an "input member" according to the present disclosure.

The internal combustion engine E is a motor (e.g., a gasoline engine or a diesel engine) that outputs mechanical power by being driven by combustion of fuel in the engine. In this embodiment, an internal combustion engine output shaft (e.g., crank shaft) serving as an output shaft of the internal combustion engine E is drivingly connected to the input shaft 31. The internal combustion engine output shaft may be drivingly connected to the input shaft 31 through a damper.

The transmission device 33 is drivingly connected to the input shaft 31. In this embodiment, the transmission device 33 is a stepped automatic transmission device that includes a plurality of shifting engagement devices, and can switch between a plurality of shift speeds with different speed ratios. The transmission device 33 may also be an automatic continuously variable transmission device that includes a movable sheave connected to a pulley and can steplessly change the speed ratios. In either case, the transmission device 33 is configured to be hydraulically driven. The transmission device 33 transmits rotation and torque input to the input shaft 31 to a transmission output gear 33g with the speed changed at a speed ratio at each timing and with torque converted. In this embodiment, the input shaft 31 serving as an "input member" also serves as a "transmission input member" in the present disclosure. The transmission output gear 33g corresponds to a "transmission output member" in the present disclosure. In this embodiment, the input shaft 31 as a transmission input member and the transmission output gear 33g as a transmission output member are coaxially disposed.

The input shaft 31 and the transmission device 33 may sandwich another device such as a fluid clutch (e.g., a torque converter or a fluid coupling). In this case, with an intermediate shaft (an output shaft of the fluid clutch) serving as a transmission input member, the transmission device 33 transmits rotation and torque input to the intermediate shaft to the transmission output gear 33g with the speed changed at a speed ratio at each timing and with torque converted. The fluid clutch may include a lockup clutch.

The transmission output gear 33g is drivingly connected to the differential gear device 35 through the counter gear mechanism 34. The differential gear device 35 is drivingly connected to the two, left and right, wheels W through the two, left and right, output shafts 36, respectively. The differential gear device 35 distributes rotation and torque transmitted from the transmission output gear 33g through the counter gear mechanism 34 to the two, left and right, wheels W. In this manner, the vehicle drive device 1 can transmit the torque of the internal combustion engine E as the driving force source P to the wheels W and enables the vehicle to run.

In this embodiment, the transmission device 33 and the input shaft 31 are coaxially disposed, and the axis of the differential gear device 35 and the output shafts 36 is different from that of the input shaft 31. The axis of the counter gear mechanism 34 is different from those of the input shaft 31 and the output shafts 36. A first axial center X1 that is a rotation axial center of the transmission device 33, a second axial center X2 that is a rotation axial center of the counter gear mechanism 34, and a third axial center X3 that is a rotation axial center of the differential gear device 35 are disposed in parallel to each other. The term "the rotation axial center of the transmission device 33" refers to the rotation axial center of the input shaft (i.e., the transmission input shaft corresponding to the input shaft 31 of this embodiment) of the transmission device 33. That is, the first axial center X1 is a rotation axial center of the input shaft (transmission input shaft) of the transmission device 33. The term "the transmission device 33 and the input shaft 31 are coaxially disposed" means that the rotation axial center of the transmission input shaft coincides with the rotation axial center of the input shaft 31 (including a state in which these rotation axial centers are in common use as described in this embodiment).

Figure 3:
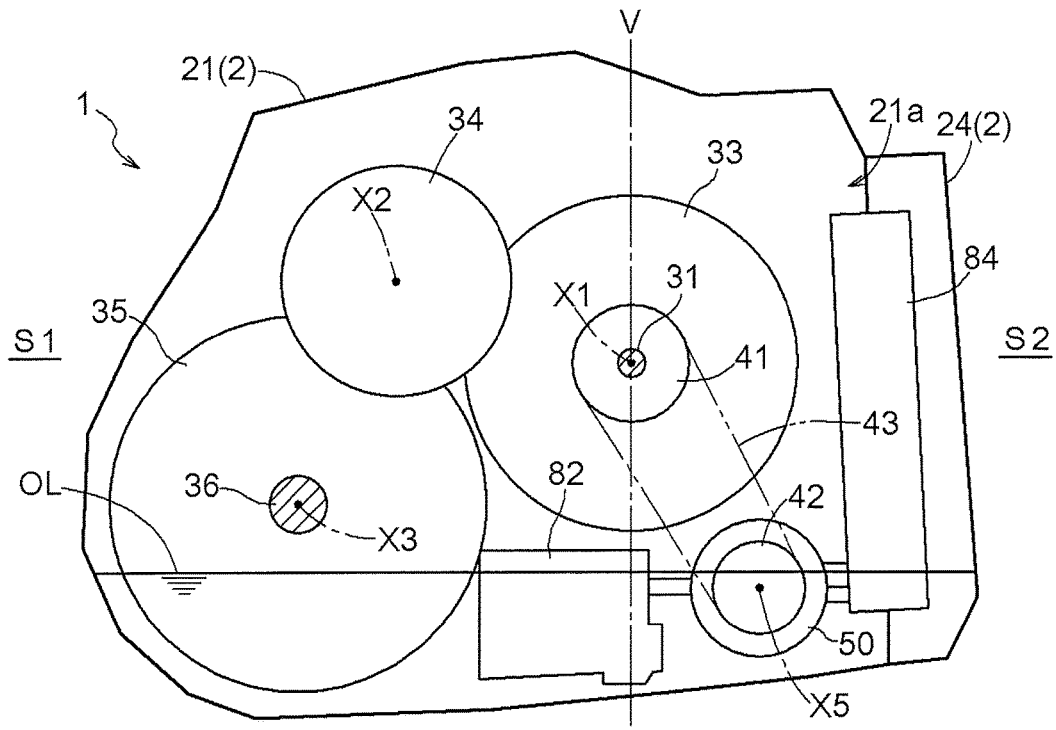
FIG. 3 is an axial view including a vertical cross section at location A in FIG. 2.
Figure 4:
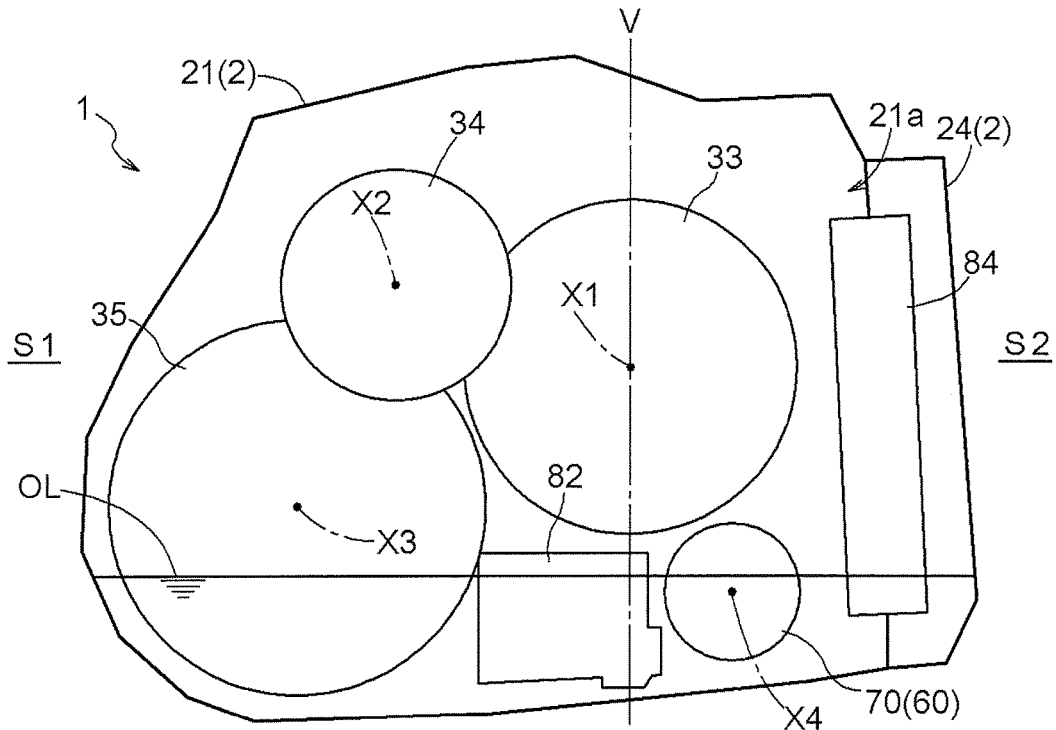
FIG. 4 is an axial view including a vertical cross section at location B in FIG. 2.

As illustrated in FIGS. 3 and 4, the first axial center X1, the second axial center X2, and the third axial center X3 are disposed so as to form a triangle (an obtuse triangle having an central angle of about 90 degrees to about 110 degrees in this example) and be respectively located at the vertexes thereof. Such a multiaxial configuration is suitable for the configuration of the vehicle drive device 1 mounted on a front engine front drive (FF) vehicle. In this embodiment, the first axial center X1 corresponds to a "transmission axial center" in the present disclosure, and the third axial center X3 corresponds to a "differential axial center" in the present disclosure. The first axial center X1 is also referred to as a "transmission input member rotation axial center" and the third axial center X3 is also referred to as a "differential gear device rotation axial center."

As illustrated in FIG. 2, the vehicle drive device 1 includes a mechanical oil pump 50 drivingly connected to the input shaft 31. The mechanical oil pump 50 is drivingly connected to the input shaft 31 through a pump driving mechanism 40. In this embodiment, the pump driving mechanism 40 includes a first sprocket 41 as a driving element, a second sprocket 42 as a driven element, and a chain 43 as a connecting element. The first sprocket 41 is fixed to the input shaft 31, and rotates together with the input shaft 31. The second sprocket 42 is fixed to a first pump driving member 52 drivingly connected to a pump body 51 (see FIG. 5) of the mechanical oil pump 50, and rotates together with the first pump driving member 52. The chain 43 is wound around the first sprocket 41 and the second sprocket 42.

Figure 5:
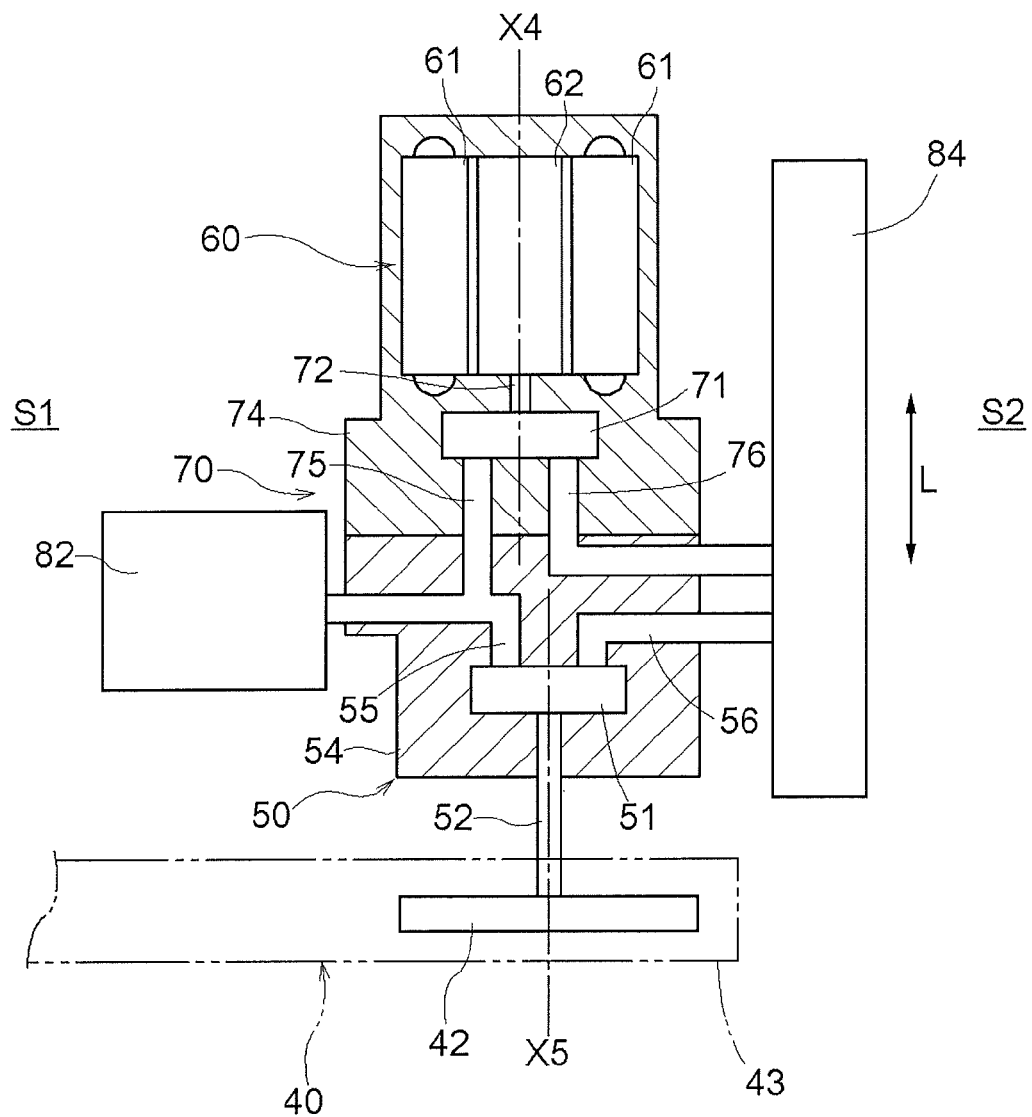
FIG. 5 is a plan view including a horizontal section passing through a pump axial center.

The pump body 51 of the mechanical oil pump 50 is an inscribed gear pump in this example. The pump body 51 includes an inner rotor and an outer rotor that respectively have gears to be engaged with each other. Note that the pump body 51 is not limited to this configuration, and may be an external gear pump or a vane pump, for example. As illustrated in FIG. 5, the pump body 51 is housed in a pump chamber defined in the first pump case 54. The mechanical oil pump 50 is driven by the torque of the internal combustion engine E transmitted to the input shaft 31 through the pump driving mechanism 40 in a state in which the internal combustion engine E is being driven (i.e., the input shaft 31 is rotating). The mechanical oil pump 50 suctions oil stored in an oil pan (in this embodiment, a lower region in the case 2 functions as an oil pan) therein and discharges oil.

As illustrated in FIG. 2, the vehicle drive device 1 includes an electric oil pump 70 as an auxiliary pump, in addition to the mechanical oil pump 50 described above. The electric oil pump 70 is drivingly connected to a pump rotary electric machine 60 provided independently of a power transmission path connecting the input shaft 31 and the output shafts 36. In this embodiment, the electric oil pump 70 is integrally provided with the pump rotary electric machine 60. As illustrated in FIG. 5, the pump rotary electric machine 60 and the electric oil pump 70 are coaxially disposed and housed in the second pump case 74 together. The pump rotary electric machine 60 includes a stator 61 fixed to the second pump case 74 and a rotor 62 rotatably supported on the radially inner side of the stator 61. The rotor 62 is fixed to the second pump driving member 72 drivingly connected to the pump body 71 of the electric oil pump 70, and rotates together with the second pump driving member 72.

Similar to the pump body 51 of the mechanical oil pump 50, the pump body 71 of the electric oil pump 70 is an inscribed gear pump in this example. The pump body 71 includes an inner rotor and an outer rotor that respectively have gears to be engaged with each other. Note that the pump body 71 is not limited to such a configuration and may be an external gear pump or a vane pump, for example. The pump body 71 is housed in a pump chamber defined in the second pump case 74. The electric oil pump 70 is driven by the torque of the pump rotary electric machine 60 while the pump rotary electric machine 60 is being driven. The electric oil pump 70 also suctions oil stored in the oil pan therein and discharges the oil.

As illustrated in FIG. 5, oil discharged from at least one of the mechanical oil pump 50 and the electric oil pump 70 is guided to the hydraulic control device 84. The hydraulic control device 84 controls a hydraulic pressure of oil discharged from at least one of the electric oil pump 70 and the electric oil pump 70. Oil adjusted to have a predetermined hydraulic pressure by the hydraulic control device 84 is then supplied to respective hydraulic devices (at least a hydraulic transmission engagement device included in the transmission device 33 in this embodiment) of the vehicle drive device 1. In this embodiment, the presence of the electric oil pump 70 can provide the engagement state of the transmission engagement devices by supplying oil thereto even while the internal combustion engine E is stationary, and thus, the vehicle can start appropriately.

In a known technique, the electric oil pump 70 and the pump rotary electric machine 60 for driving the electric oil pump 70 are typically attached to the outside of the case 2. This is because it is considered to be difficult to dispose the electric oil pump 70 and other components in internal space having a limited size in the case 2. On the other hand, as an important feature of the present disclosure, the electric oil pump 70 and the pump rotary electric machine 60 are housed in the case 2, as illustrated in FIGS. 3 and 4. Merely housing the electric oil pump 70 and other components in the case 2 may increase the size of the entire device. To prevent this, according to the present disclosure, the electric oil pump 70 and other components are disposed by effectively utilizing a limited space in the case 2, thereby suppressing an increase in size of the entire device, as described later. This is another important feature of the present disclosure. The following description is based on the assumption that the device is mounted on a vehicle (in a vehicle mounted state).

In this embodiment, the pump rotary electric machine 60 is disposed on the axis different from each of the axis of the input shaft 31 and the transmission device 33, the axis of the counter gear mechanism 34, and the axis of the differential gear device 35 and the output shafts 36. A fourth axial center X4 that is a rotation axial center of the pump rotary electric machine 60 is disposed in parallel with the first axial center X1 that is the rotation axial center of the transmission input shaft (input shaft 31 in this example), the second axial center X2 that is the rotation axial center of the counter gear mechanism 34, and the third axial center X3 that is the rotation axial center of the differential gear device 35. As illustrated in FIG. 4, the fourth axial center X4 is located outside the triangle whose vertexes respectively correspond to the axial centers X1 to X3, when viewed in an axial direction L. In this embodiment, the fourth axial center X4 corresponds to a "pump axial center" in the present disclosure. The fourth axial center X4 is also referred to as a "pump rotary electric machine rotation axial center." The second axial center X2 is also referred to as a "counter gear mechanism rotation axial center" and is also referred to simply as a "counter axial center."

In this embodiment, the hydraulic control device 84 is a flat rectangular when viewed in the axial direction L. The hydraulic control device 84 stands substantially vertically and is housed in the case 2 in a side portion when viewed in the axial direction L. Such a layout of the hydraulic control device 84 has an advantage in downsizing the entire device by reducing the total width thereof in a horizontal direction perpendicular to the axial direction L.

For convenience of description, one horizontal side in the axial direction L when viewed in the axial direction L (i.e., the left side in FIGS. 3 and 4) is referred to as a "first side S1" and the other horizontal side (i.e., the right side) is referred to as a "second side S2." An irregularly shaped cylindrical peripheral wall 21 covering a surrounding area of the transmission device 33, the counter gear mechanism 34, and the differential gear device 35 in the case 2 has an opening 21*a* that opens toward the second side S2 when viewed in the axial direction L. The hydraulic control device 84 is disposed at the opening 21*a*. A cover member 24 is fixed to the peripheral wall 21 in a sealed state so as to cover the opening 21*a*.

As illustrated in FIG. 3, for example, in this embodiment, among the first axial center X1 that is the rotation axial center of the transmission input shaft (input shaft 31 in this example), the second axial center X2 that is the rotation axial center of the counter gear mechanism 34, and the third axial center X3 that is the rotation axial center of the differential gear device 35, the second axial center X2 is located at the highest. Among the axial centers X1 to X3, the third axial center X3 is located at the lowest. That is, the first axial center X1, the second axial center X2, and the third axial center X3 are disposed such that the second axial center X2, the first axial center X1, and the third axial center X3 are arranged in this order in a vertical direction from above. In the horizontal arrangement when viewed in the axial direction L, the first axial center X1 and the third axial center X3 are disposed at opposite sides with respect to the second axial center X2. Specifically, in this example, the first axial center X1 is disposed closer to the second side S2 near the hydraulic control device 84 than the second axial center X2 is, and the third axial center X3 is disposed closer to the first side S1 as the opposite side to the hydraulic control device 84 than the second axial center X2 is. That is, the first axial center X1, the second axial center X2, and the third axial center X3 are disposed such that the third axial center X3, the second axial center X2, and the first axial center X1 are arranged in this order from the first side S1 in the horizontal direction. The hydraulic control device 84 is closer to the second side S2 than the first axial center X1 is.

With regard to the positional relationship among the first axial center X1, the third axial center X3, and the hydraulic control device 84, the third axial center X3 is located below the first axial center X1 and closer to one side (the first side S1 in this example) than the first axial center X1 is when viewed in the axial direction L. The hydraulic control device 84 is disposed at the other side (the second side S2 in this example) to the third axial center X3 with respect to the first axial center X1. That is, the third axial center X3, the first axial center X1, and the hydraulic control device 84 are arranged in this order from the first side S1 in the horizontal direction when viewed in the axial direction L. Each of the differential gear device 35 and the hydraulic control device 84 is disposed so as not to overlap a vertical plane V passing through the first axial center X1 (including two optional points on the first axial center X1, i.e., including the first axial center X1) when viewed in the axial direction L. The differential gear device 35 is disposed closer to the first side S1 with respect to the vertical plane V passing through the first axial center X1, and the hydraulic control device 84 is disposed closer to the second side S2 with respect to the vertical plane V. The vertical plane V does not actually exist, and is a virtual plane.

In this embodiment, the counter gear mechanism 34 is disposed so as to partially overlap each of the transmission device 33 and the differential gear device 35 when viewed in the axial direction L. With regard to arrangement of two members, the term "partially overlap when viewed in a certain direction" means that "when a virtual line that is parallel to the viewing direction is moved to a direction perpendicular to the virtual line, the virtual line at least partially overlaps each of the two members. On the other hand, the transmission device 33 and the differential gear device 35 are disposed so as not to overlap each other when viewed in the axial direction L. The distance between the first axial center X1 and the third axial center X3 is set to be larger than the sum of a radius of the transmission device 33 and a radius of the differential gear device 35. The differential gear device 35 is formed to have a diameter larger than that of the transmission device 33. In addition, in the vertical direction, the lowest point of the transmission device 33 is set to be located below (in this example, substantially at the same level as) the third axial center X3, and the hydraulic control device 84 is disposed so as to be located below at least the lowest point of the transmission device 33. In this example, the lowest point of the hydraulic control device 84 is located near a middle point between the lowest point of the differential gear device 35 and the lowest point of the transmission device 33.

In this configuration, dead space is formed between the differential gear device 35 and the hydraulic control device 84 below the transmission device 33 and in the horizontal direction in the case 2 when viewed in the axial direction L (see FIG. 3, for example). In view of this, in this embodiment, to utilize such dead space effectively, the pump rotary electric machine 60 is disposed below the first axial center X1 and between the differential gear device 35 and the hydraulic control device 84 when viewed in the axial direction L, as illustrated in FIG. 4. In addition, in this embodiment, the fourth axial center X4 that is the rotation axial center of the pump rotary electric machine 60 is disposed below the first axial center X1 and between the first axial center X1 and the hydraulic control device 84 when viewed in the axial direction L. The pump rotary electric machine 60 is disposed so as not to overlap any of the transmission device 33 and the hydraulic control device 84 when viewed in the axial direction L.

The electric oil pump 70 and the pump rotary electric machine 60 are entirely located between the first axial center X1 and the hydraulic control device 84 when viewed in the axial direction L. The electric oil pump 70 and the pump rotary electric machine 60 are disposed in a V-shaped region formed between an outer peripheral surface of the transmission device 33 and a side surface of the hydraulic control device 84 at the first side S1 when viewed in the axial direction L. The electric oil pump 70 and the pump rotary electric machine 60 are entirely located below the third axial center X3 and above the lowest point of the differential gear device 35 in the vertical direction. With such a layout configuration, internal space of the case 2 (especially lower space in the case 2) can be effectively utilized. As a result, an increase in size of the entire vehicle drive device 1 can be effectively suppressed.

Since the pump rotary electric machine 60 for driving the electric oil pump 70 is housed in the case 2, an oil-cooled structure using oil stored in the case 2 can be employed to cool the pump rotary electric machine 60. Thus, the cooling capability of the pump rotary electric machine 60 can be enhanced, and a temperature rise in the pump rotary electric machine 60 can be effectively suppressed. Accordingly, power of the pump rotary electric machine 60 can be enhanced without an increase in size thereof, or the pump rotary electric machine 60 can be downsized with the power thereof being maintained at a certain level or higher. Alternatively, both of the enhanced power and the downsizing of the pump rotary electric machine 60 described above can be achieved in a balanced manner. In particular, in a configuration in which at least a part of the pump rotary electric machine 60 is disposed so as to be located below an oil level OL of oil stored in the case 2, a portion of the pump rotary electric machine 60 submerged in the oil can be substantially always cooled. Accordingly, a temperature rise in the pump rotary electric machine 60 can be more effectively suppressed and further enhancement of power and/or further downsizing of the pump rotary electric machine 60 can be achieved. Here, the oil level OL is preferably set at a standard level during operation of the vehicle drive device 1 (while the vehicle is running). The oil level OL may also be a static oil level.

In this embodiment, in terms of utilizing the dead space described above effectively, the mechanical oil pump 50 is also disposed below the first axial center X1 and between the differential gear device 35 and the hydraulic control device 84 when viewed in the axial direction L, as illustrated in FIG. 3. In addition, a fifth axial center X5 that is a rotation axial center of the mechanical oil pump 50 (first pump driving member 52) is disposed below the first axial center X1 and between the first axial center X1 and the hydraulic control device 84 when viewed in the axial direction L. The fifth axial center X5 is also referred to as a "mechanical oil pump rotation axial center" and is also referred to simply as a "mechanical pump axial center." The mechanical oil pump 50 is disposed so as not to overlap with any of the transmission device 33 and the hydraulic control device 84 when viewed in the axial direction L.

As illustrated in FIG. 5, in this embodiment, the mechanical oil pump 50 is disposed on an axis different from that of the pump rotary electric machine 60 and the electric oil pump 70. The fourth axial center X4 that is the rotation axial center of the pump rotary electric machine 60 is slightly shifted toward the first side S1 with respect to the fifth axial center X5 that is the rotation axial center of the mechanical oil pump 50 in this example. In this regard, the mechanical oil pump 50, the pump rotary electric machine 60, and the electric oil pump 70 can also be described as being substantially on the same axis. These members are arranged side by side in the axial direction L. With such a layout configuration, including arrangement of the mechanical oil pump 50, internal space of the case 2 can be effectively used. The fourth axial center X4 may be shifted toward the second side S2 with respect to the fifth axial center X5.

In this embodiment, from a similar point of view, a strainer 82 for filtering oil to be suctioned into both the oil pumps 50 and 70 is disposed below the first axial center X1 and between the differential gear device 35 and the hydraulic control device 84 when viewed in the axial direction L. In this embodiment, the strainer 82 is disposed below the first axial center X1 and between the differential gear device 35 and the oil pumps 50 and 70 when viewed in the axial direction L. The strainer 82 and the oil pumps 50 and 70 are arranged side by side in the horizontal direction at substantially the same vertical level. With such a layout configuration, including arrangement of the strainer 82, the internal space of the case 2 can be effectively used. In addition, at least a part of the strainer 82 is also located below the oil level OL in a manner similar to the pump rotary electric machine 60. Thus, oil can be suctioned in an appropriate manner advantageously.

As illustrated in FIG. 5, in the layout configuration described above, the strainer 82, both the oil pumps 50 and 70, and the hydraulic control device 84 are arranged in this order in the horizontal line. Thus, a flow of oil from the strainer 82 to the hydraulic control device 84 is substantially linear. Specifically, the first pump case 54 and the second pump case 74 that are joined to each other include four oil channels (i.e., a first suction oil channel 55, a first discharge oil channel 56, a second suction oil channel 75, and a second discharge oil channel 76). The first suction oil channel 55 is an oil channel connecting the strainer 82 and a suction port of the pump body 51 of the mechanical oil pump 50. The first discharge oil channel 56 is an oil channel connecting a discharge port of the pump body 51 and the hydraulic control device 84. The second suction oil channel 75 is an oil channel connecting the strainer 82 and a suction port of the pump body 71 of the electric oil pump 70. The second discharge oil channel 76 is an oil channel connecting a discharge port of the pump body 71 and the hydraulic control device 84.

The first suction oil channel 55 and the second suction oil channel 75 are formed so as to share portions on the upstream side thereof (portions toward the strainer 82). The first discharge oil channel 56 and the second discharge oil channel 76 are formed as oil channels independent of each other. The shared oil channel portions of the first suction oil channel 55 and the second suction oil channel 75 and part of downstream portions (toward the hydraulic control device 84) of the first discharge oil channel 56 and the second discharge oil channel 76 extend linearly and are parallel to each other. The substantially linear oil flow in these oil channels has an advantage of enhancing the suction efficiency and the discharge efficiency of both the oil pumps 50 and 70. Thus, this configuration can contribute to enhancing energy efficiency of the entire device.

Other Embodiments

Lastly, vehicle drive devices according to other embodiments of the present disclosure will be described. Each of the configurations disclosed in the following embodiments may be combined with those disclosed in other embodiments as far as no contradiction arises.

(1) In the embodiment described above, the present disclosure is applied to a drive device for an engine vehicle. However, embodiments of the present disclosure are not limited to this example. For example, the present disclosure is applicable to a drive device for a hybrid vehicle including both an internal combustion engine E and a rotary electric machine (rotary electric machine for driving wheels) as driving force sources P for vehicle wheels W. In the case of a drive device for a hybrid vehicle, the mechanical oil pump 50 may be driven by a predetermined one of torque of the internal combustion engine E and torque of the rotary electric machine. Alternatively, the mechanical oil pump 50 may be selectively driven by one of the internal combustion engine E and the rotary electric machine, whichever shows a higher rotation speed. The present disclosure is also applicable to a drive device for an electric vehicle including a rotary electric machine (rotary electric machine for driving wheels) as a sole driving force source P for wheels W of the vehicle.

(2) In the embodiment described above, at least a part of the pump rotary electric machine 60 is located below the oil level OL of oil stored in the case 2. However, embodiments of the present disclosure are not limited thereto. The pump rotary electric machine 60 may be entirely disposed above the oil level OL of oil stored in the case 2. In this case, the location of the pump rotary electric machine 60 may be determined in such a manner that the pump rotary electric machine 60 is at least partially submerged in oil when the oil level increases under the influence of, for example, an inertial force while the vehicle is running. Alternatively, an oil channel for ejecting oil to the pump rotary electric machine 60 or for distributing oil around the pump rotary electric machine 60 may be provided on a wall of the case 2.

(3) In the embodiment described above, the strainer 82 is disposed between the differential gear device 35 and both the oil pumps 50 and 70 when viewed in the axial direction L. However, embodiments of the present disclosure are not limited thereto. For example, the strainer 82 may be disposed so as to overlap both the oil pumps 50 and 70 in the vertical direction.

(4) In the embodiment described above, the hydraulic control device 84 that is a flat rectangular when viewed in the axial direction L stands substantially vertically. However, embodiments of the present disclosure are not limited thereto. For example, the hydraulic control device 84 may be tilted with respect to the vertical direction. Alternatively, the hydraulic control device 84 may be formed in a square when viewed in the axial direction L.

(5) In the embodiment described, the mechanical oil pump 50 and the electric oil pump 70 are disposed on different axes and are arranged side by side in the axial direction L. However, embodiments of the present disclosure are not limited thereto. For example, both the oil pumps 50 and 70 may be disposed so as to be separated from each other in the axial direction L. In this case, the mechanical oil pump 50 may be coaxially disposed with the input shaft 31, for example. Alternatively, both the oil pumps 50 and 70 may be coaxially disposed.

(6) In the embodiment described above, the first suction oil channel 55 and the second suction oil channel 75 are formed to share portions on the upstream side thereof. In addition, in the embodiment described above, the first discharge oil channel 56 and the second discharge oil channel 76 are formed as oil channels independent of each other. However, embodiments of the present disclosure are not limited thereto. For example, the first suction oil channel 55 and the second suction oil channel 75 may be formed as oil channels independent of each other. The first discharge oil channel 56 and the second discharge oil channel 76 may be formed to share downstream portions thereof.

(7) In the embodiment described above, the pump driving mechanism 40 for drivingly connect the mechanical oil pump 50 and the input shaft 31 includes the two sprockets 41 and 42 and the chain 43 wound around the sprockets 41 and 42. However, embodiments of the present disclosure are not limited thereto. The pump driving mechanism 40 may employ a known specific configuration. For example, the pump driving mechanism 40 may include a first pulley configured to rotate together with the input shaft 31, a second pulley fixed to the first pump driving member 52, and a belt wound around these two pulleys. Alternatively, the pump driving mechanism 40 may include a first gear member configured to rotate together with the input shaft 31, a second gear member fixed to the first pump driving member 52, and a gear mechanism configured to be meshed with each gear formed in these two members.

(8) In the embodiment described above, the input shaft 31 as a transmission input member and the transmission output gear 33g as a transmission output member are coaxially disposed in the transmission device 33. However, embodiments of the present disclosure are not limited thereto. For example, the transmission input shaft and the transmission output member may be provided on different axes in the transmission device 33.

(9) With regard to other configurations, embodiments disclosed herein are merely examples in all respects, and it should be understood that the present disclosure is not limited to these embodiments. Those skilled in the art will easily understand that appropriate modifications can be made without departing from the gist of the present disclosure. Accordingly, the scope of the present disclosure naturally includes also other embodiments that are modified without departing from the gist of the present disclosure.

INDUSTRIAL APPLICABILITY

The present disclosure is used, for example, for a vehicle drive device for driving a vehicle having an idling stop function, for example.

The invention claimed is:

1. A vehicle drive device for a vehicle configured with a combustion engine as a driving source, the vehicle drive device comprising:
    a hydraulic transmission device that includes a transmission input member, the hydraulic transmission device configured to change a speed of rotation of the transmission input member and transmits the rotation to a transmission output member;
    a differential gear device that has an axis different from an axis of the transmission input member and configured to distribute a drive force transmitted from the transmission output member to left and right shafts such that the left and right shafts can rotate at different speeds from each other;
    a sealed case that houses at least the transmission device and the differential gear device;
    an electric oil pump that is driven by a pump rotary electric machine; and
    a hydraulic control device that controls a hydraulic pressure of oil discharged from the electric oil pump and supplies the oil at least to the transmission device, wherein
    the electric oil pump and the pump rotary electric machine are housed in the case,
    the transmission device, the differential gear device, and the pump rotary electric machine are disposed such that a transmission axial center that is a rotation axial center of the transmission input member, a differential axial center that is a rotation axial center of the differential gear device, and a pump axial center that is a rotation axial center of the pump rotary electric machine are parallel to one another,
    the differential gear device is disposed such that the differential axial center is located below the transmission axial center and the differential axial center is not located on a vertical plane passing through the transmission axial center when viewed in an axial direction parallel to the axial centers in a vehicle mounted state,
    the hydraulic control device is disposed such that the vertical plane is between the hydraulic control device and the differential axial center when viewed in the axial direction,
    the pump rotary electric machine is disposed such that the pump axial center is located below the transmission axial center and between the transmission axial center and the hydraulic control device when viewed in the axial direction, and
    the pump rotary electric machine is disposed so as not to overlap any of the transmission device and the hydraulic control device when viewed in the axial direction.

2. The vehicle drive device according to claim 1, wherein at least a part of the pump rotary electric machine is located below an oil level of oil stored in the case.

3. The vehicle drive device according to claim 1, further comprising
    a strainer for filtering oil, wherein
    the strainer is located below the transmission axial center and between the differential axial center and the electric oil pump when viewed in the axial direction.

4. The vehicle drive device according to claim 1, further comprising
    a mechanical oil pump that is driven by the driving force source, wherein
    the mechanical oil pump is disposed such that a rotation axial center of the mechanical oil pump is located below the transmission axial center and between the transmission axial center and the hydraulic control device when viewed in the axial direction.

5. The vehicle drive device according to claim 2, further comprising
    a strainer for filtering oil, wherein
    the strainer is located below the transmission axial center and between the differential axial center and the electric oil pump when viewed in the axial direction.

6. The vehicle drive device according to claim 2, further comprising
    a mechanical oil pump that is driven by the driving force source, wherein
    the mechanical oil pump is disposed such that a rotation axial center of the mechanical oil pump is located below the transmission axial center and between the transmission axial center and the hydraulic control device when viewed in the axial direction.

7. The vehicle drive device according to claim 3, further comprising
    a mechanical oil pump that is driven by the driving force source, wherein
    the mechanical oil pump is disposed such that a rotation axial center of the mechanical oil pump is located below the transmission axial center and between the transmission axial center and the hydraulic control device when viewed in the axial direction.

8. The vehicle drive device according to claim 5, further comprising
    a mechanical oil pump that is driven by the driving force source, wherein
    the mechanical oil pump is disposed such that a rotation axial center of the mechanical oil pump is located below the transmission axial center and between the transmission axial center and the hydraulic control device when viewed in the axial direction.

* * * * *